United States Patent
Hall et al.

(10) Patent No.: US 10,251,193 B2
(45) Date of Patent: Apr. 2, 2019

(54) SYSTEM AND DEVICES USING A PREAMBLE-BASED DSS COMMUNICATION LINK AND SPECTRUM-IMPACT-SMOOTHED CHANNEL SETS IMPLEMENTING CHANNEL RESYNCHRONIZATION

(71) Applicants: David R. Hall, Provo, UT (US); Craig Boswell, Draper, UT (US); Everett D. Robinson, Pleasant Grove, UT (US); Joe Fox, Spanish Fork, UT (US)

(72) Inventors: David R. Hall, Provo, UT (US); Craig Boswell, Draper, UT (US); Everett D. Robinson, Pleasant Grove, UT (US); Joe Fox, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/612,021

(22) Filed: Jun. 2, 2017

(65) Prior Publication Data

US 2018/0352569 A1    Dec. 6, 2018

(51) Int. Cl.

| | |
|---|---|
| *H04W 72/14* | (2009.01) |
| *H04W 72/04* | (2009.01) |
| *H04W 28/18* | (2009.01) |
| *H04W 72/12* | (2009.01) |
| *H04L 5/00* | (2006.01) |
| *H04W 4/70* | (2018.01) |

(52) U.S. Cl.
CPC .......... *H04W 72/14* (2013.01); *H04W 28/18* (2013.01); *H04W 72/0446* (2013.01); *H04L 5/0007* (2013.01); *H04W 4/70* (2018.02); *H04W 72/1289* (2013.01)

(58) Field of Classification Search
CPC ...... H04L 5/0007; H04L 67/125; H04W 4/70; H04W 28/18; H04W 72/0446; H04W 72/1289; H04W 72/14
See application file for complete search history.

(56) References Cited

U.S. PATENT DOCUMENTS

| | | | |
|---|---|---|---|
| 9,432,077 B2* | 8/2016 | Schmidl | H04B 1/707 |
| 9,979,435 B1* | 5/2018 | Hall | H04B 1/7156 |

(Continued)

*Primary Examiner* — Benjamin H Elliott, IV

(57) ABSTRACT

Disclosed herein are wireless devices operable at intermediate wireless at ranges of thousands of meters, utilizing packets that include a preamble and a data payload. Devices may be such things as keypads, door latches, occupancy monitors, sprinkler controllers and other devices needing a communications link. A digital spread-spectrum frequency hopping rotation is used, wherein packet transmissions rotate through frequency sequences. A spectrum-impact-smoothed channel set is fashioned using sequences that each specify a unique preamble frequency relative to the other sequences and channels. The set is traversed as packets are transmitted, thereby distributing the focused radio-frequency emission impact of packets having long preambles over time. Observance of a long- and short-period timer permits channel resynchronization between devices. Detailed information on various example embodiments of the inventions are provided in the Detailed Description below, and the inventions are defined by the appended claims.

20 Claims, 7 Drawing Sheets

(56) References Cited

U.S. PATENT DOCUMENTS

| | | | | |
|---|---|---|---|---|
| 2002/0159434 | A1* | 10/2002 | Gosior | H04L 1/1685 370/350 |
| 2006/0126491 | A1* | 6/2006 | Ro | H04L 27/2647 370/208 |
| 2006/0285579 | A1* | 12/2006 | Rhee | H04B 1/7156 375/132 |
| 2010/0072380 | A1* | 3/2010 | Britton, Jr. | G06Q 10/08 250/370.07 |
| 2013/0251000 | A1* | 9/2013 | Shuey | H04B 1/7156 375/134 |
| 2014/0293869 | A1* | 10/2014 | Jeffery | H04W 74/0808 370/328 |
| 2015/0341078 | A1* | 11/2015 | Lingam | H04B 1/7075 375/149 |
| 2016/0048111 | A1* | 2/2016 | Wong | H01J 37/32082 700/109 |
| 2018/0191564 | A1* | 7/2018 | Hall | H04L 41/0806 |
| 2018/0352569 | A1* | 12/2018 | Hall | H04W 72/14 |

* cited by examiner

FIG. 1
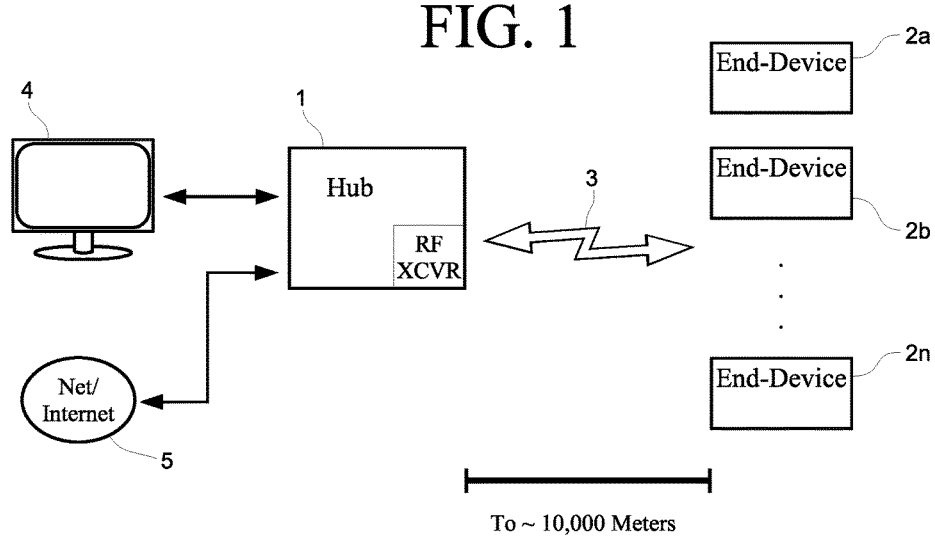
To ~ 10,000 Meters
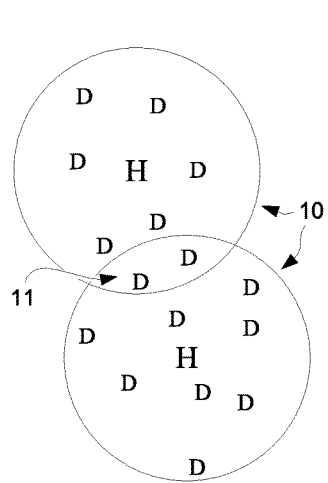
FIG. 2
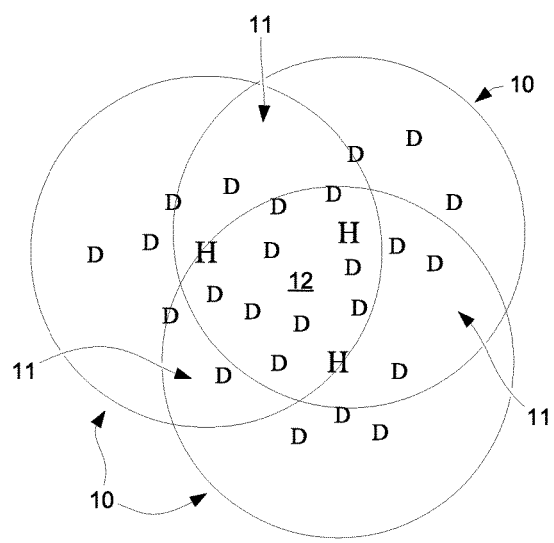
FIG. 3

FIG. 4
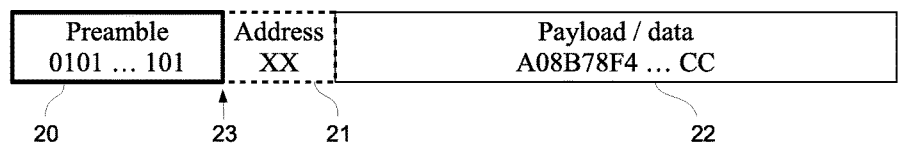
FIG. 5
FIG. 7
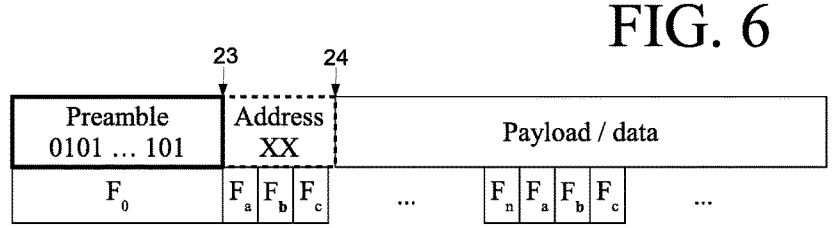
FIG. 6
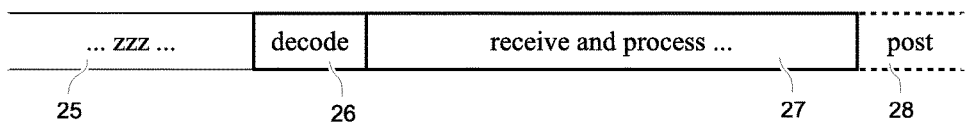

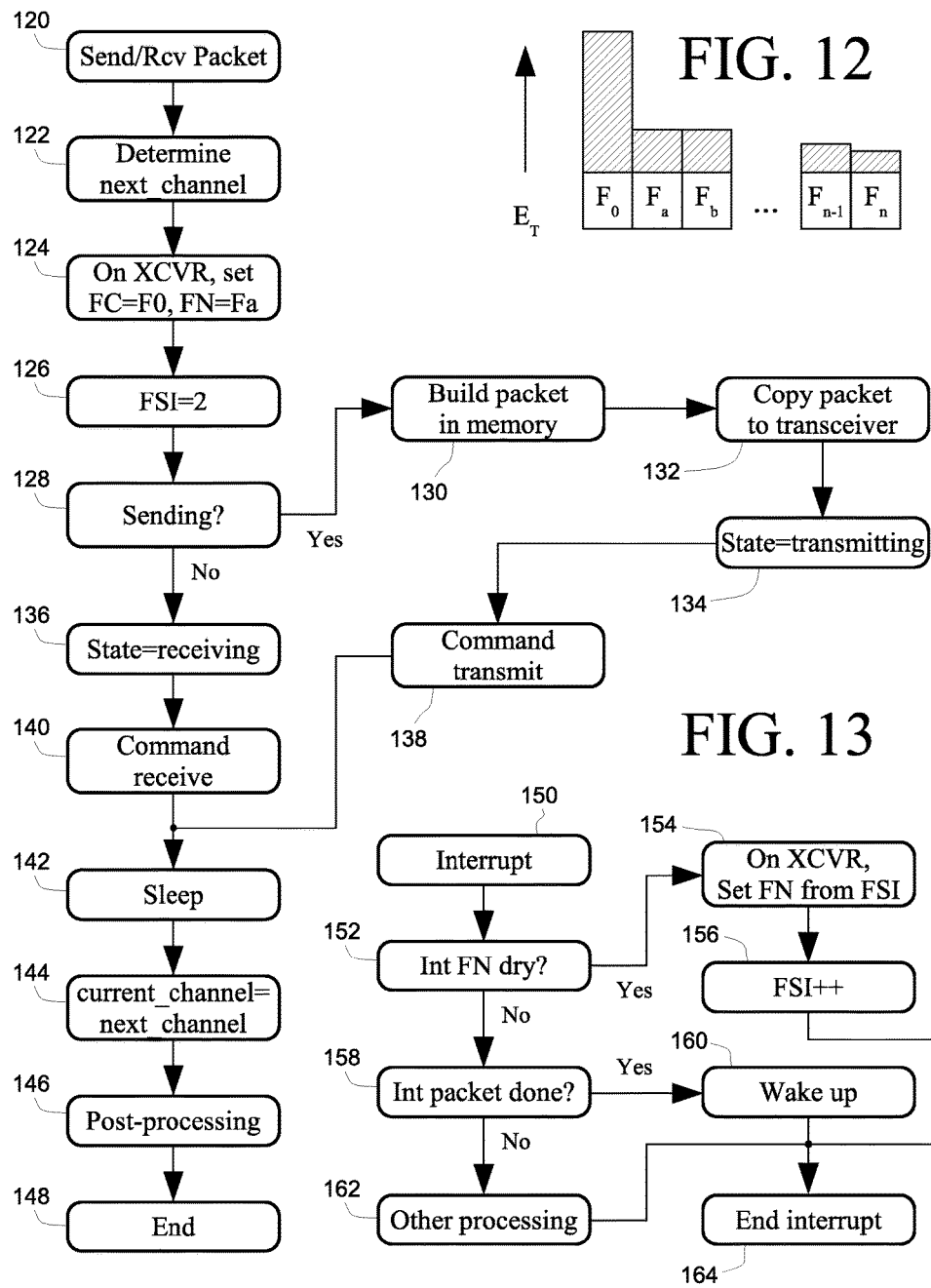

SYSTEM AND DEVICES USING A PREAMBLE-BASED DSS COMMUNICATION LINK AND SPECTRUM-IMPACT-SMOOTHED CHANNEL SETS IMPLEMENTING CHANNEL RESYNCHRONIZATION

BACKGROUND

In recent history, relatively inexpensive electronic devices have become available to ordinary property-owners that wish to monitor and control various aspects of their properties. A recent concept called the "Internet of Things" imagines home-related electronic devices that can be reached through the Internet, by which an environment can be controlled, e.g. lighting, temperature, digital video recorders, and many other "smart" devices. That kind of device ordinarily requires a connection to a network switch or hub, which connection can be wired or wireless.

Wireless connections to such smart devices are often desired, particularly in existing constructions, avoiding the laying of wires in existing walls and other structures. Technologies serving this purpose include low-wattage devices that communicate using the 2.4 GHz 802.11b/g "WiFi" protocol, and other more-recent and similar protocols such as Zigbee and Z-Wave. These protocols generally permit data rates of 100 k bytes per second or more, allowing for devices that transmit and forward audio and video data in substantial real-time. However with high data rates come a vulnerability to interference from other devices operating on the same radio bands, and accordingly devices using these short-range protocols are generally limited to service within a single residence or building within a distance of less than 100 meters.

Recent technologies have been developed that permit operation to an intermediate range, communicating between points that are several miles or more away, for example using the LoRaWAN protocol. In this type of network, interference reduction is achieved by using frequencies in the UHF band and by including redundancies in communication, using for example multiple sampling, multiple frequency (spread-spectrum) techniques, and/or error-tolerant protocols. The use of the UHF band avoids interference from over-the-horizon sources, while at the same time avoiding some attenuation-of-signal from water-vapor, precipitation, buildings and other physical obstructions. These redundancies and protocols necessarily reduce the data throughput such that audio and video data cannot be streamed in good quality or in real-time.

An exemplary use of intermediate-range communication is in the recent deployment of wireless utility meters. Having a utility meter that can be read without a person traveling to and visually looking at it is a substantial cost savings for a utility. For such a use a meter communicates two items of information, which are an identifier for the meter and the meter reading itself; the utility takes a pair of such items and generates a bill for a utility subscriber. Because utility bills are ordinarily generated once per month, the amount of data from a single meter is usually on the order of a few tens of bytes in that period. Thus tens or even hundreds of thousands of meters can share a single intermediate-range channel, largely without interference from other devices.

The unsuitability of existing systems at intermediate ranges for large numbers of devices, for example in the Internet-Of-Things, is an unsolved problem. Turning now to FIG. 2, two proximal short-range networks are conceptually shown, such as those constructed from devices communicating through the 802.11g protocol, for example using the Zigbee specification. In the example two property owners each operate a hub "H" servicing multiple devices "D", and as shown in the figure the circumference of effective communication 10 of each hub is proximal so as to create a zone of interference 11. Communication with the devices in that zone can be affected by communications with a non-subscribing hub, so as to introduce possible packet transmission collisions and interference. However, because these networks are short-range, the zone of interference 11 is relatively small, and the frequency of collisions and interference is likewise negligible. Proximal operators of such networks can experience impacts, but because of the short-range and the short transmission time of packets, these impacts are minor and usually acceptable.

In contrast and as shown in FIG. 3, three intermediate-range networks are located in similar proximity, each with a hub "H" and subscribing devices "D". Because of the greater distance of communication provided, most devices "D" are located in zones of interference 11, and many devices may be located in regions 12 where several hubs are located within range. Thus where intermediate-range networks are to be used, most communication between hubs and devices and also inter-device communications should be expected to take place under conditions of interference, especially when located within a city or other populated area. Utility meter reading and other existing installations using the LoRa or LoRaWAN protocols manage this congestion by being the only network in the radio locality on a particular frequency, and by infrequent packet transmission on the order of once per week or month such that collisions between devices aren't likely. Utility meters are configured and installed by the utility provider, who can limit the number of end-devices within a locality to ensure network reliability. Because the provider is the only consumer of the applicable bandwidth resources, it can effectively control interference and manage congestion.

Unavailable on the consumer market today are hubs and end-devices that can operate at intermediate ranges. The short-range "WiFi" 802.11b/g network is now so popular that in most urban areas there is a router within communicative range no matter where a person finds himself; most households using the Internet now have one, purchased from a retailer. If the range of those routers and the devices they service were to be extended to an intermediate range, the result would be a collapse of system functionality from overwhelming interference. Thus, in order to bring intermediate-range devices to the ordinary consumer, further development is needed.

The existing intermediate-range techniques, however, aren't conducive for applications where interactivity is need. For a channel sharing thousands of meters, it isn't necessary to resolve collisions between devices in a matter of milliseconds, because data transmissions can be delayed without significant impacts. In another example, an irrigation controller will ordinarily keep a set of sprinklers on for minutes at a time, and a delay of multiple seconds or even minutes is tolerable. In contrast, a person activating a light switch, for example, will not accept activation of lights with perhaps more than a one-second delay. Where a person enters a code on a keypad to enter a building, he expects a controlled lock to deactivate in real-time. In general, the existing intermediate-range technologies are fault-susceptible and not reliable for such interactivity, particularly where multiple devices share a common communications frequency or channel.

Interactivity issues for battery-powered devices can be even worse. For these devices, it is generally undesirable to keep a receiver continuously powered, and worse to repeatedly being awakened from a sleep mode to process and discriminate packets destined for other devices. The LoRaWAN Class A and B protocols address this by having end-devices turn off their receivers for long periods of time, waking up periodically to interact with a network gateway. Such a device may remain asleep for seconds, minutes or even hours, and thus cannot be made responsive to incoming queries. Furthermore, these protocols are susceptible to collisions from co-transmitting devices, which may require backing off interactions with a hub, and no time of reception can be guaranteed. Thus absent from the field of the invention is a system that can provide adequate and reliable service for groups of sensed and controlled remote devices at intermediate ranges.

BRIEF SUMMARY

Disclosed herein are wireless devices operable at intermediate wireless at ranges of thousands of meters, utilizing packets that include a preamble and a data payload. Devices may be such things as keypads, door latches, occupancy monitors, sprinkler controllers and other devices needing a communications link. A digital spread-spectrum frequency hopping rotation is used, wherein packet transmissions rotate through frequency sequences. A spectrum-impact-smoothed channel set is fashioned using sequences that each specify a unique preamble frequency relative to the other sequences and channels. The set is traversed as packets are transmitted, thereby distributing the focused radio-frequency emission impact of packets having long preambles over time. Observance of a long- and short-period timer permits channel resynchronization between devices. Detailed information on various example embodiments of the inventions are provided in the Detailed Description below, and the inventions are defined by the appended claims.

BRIEF DESCRIPTION OF THE DRAWINGS

FIG. 1 depicts a network topology utilizing multiple end-devices and an interactive hub.

FIG. 2 depicts potential interference in two proximal short-range wireless networks.

FIG. 3 depicts potential interference in three proximal intermediate-range wireless networks.

FIG. 4 shows an exemplary wireless data packet structure that includes a preamble and a variable payload.

FIG. 5 illustrates an exemplary frequency-sequence table usable in digital spread-spectrum communications between a hub and an end-device.

FIG. 6 depicts typical power states of an end-device through the course of reception of one kind of intermediate-range wireless packet.

FIG. 7 shows an exemplary set of discrete and orthogonal wireless channels for communication between a hub and a set of end-devices.

FIG. 10 illustrates the operation of a wireless device on one side of a DSS communication link having a microcontroller and a transceiver.

FIG. 11 depicts a procession of packets including a synchronization directive of successive SIS channel switching.

FIG. 12 depicts a representative accumulated emissions on a frequency spectrum for a transmitter operating using a single DSS channel and preamble-based packets.

FIG. 13 shows traversal of a microcontroller through an exemplary set of states using an spectrum-impact-smoothed channel set.

DETAILED DESCRIPTION

Figure 8:
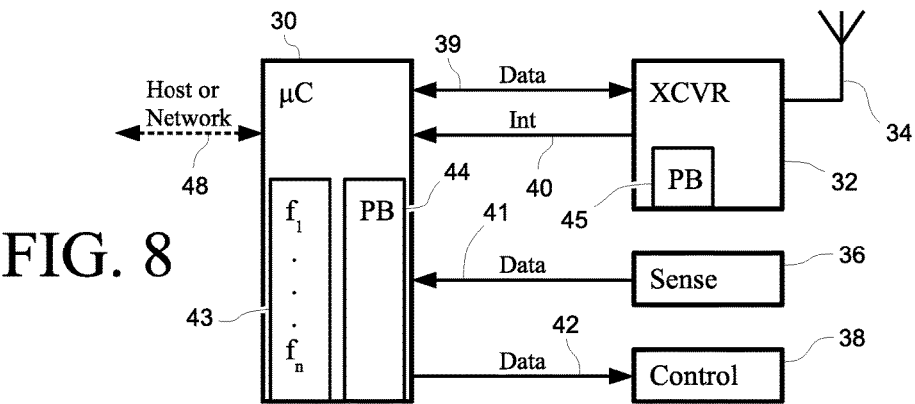
FIG. 8 shows an exemplary circuit architecture suitable for an ordinary end-device.

Shown in FIG. 1 is an exemplary intermediate system employing a hub-type topology. A hub 1 is placed within wireless range of end-devices 2*a-n*, communicating 3 over the airwaves at a distance of up to 10 km or more, depending upon environmental conditions. In many cases, end-devices 2 are electronic devices that accept commands and transmit information to a controlling hub 1. Included in hub 1 and each of end-devices 2*a-n* is a processor, software for performing the functions of the device, and an RF transceiver. Hub 1 could be an ordinary personal computer with an RF adapter or card installed, or it might simply look like a box with an antenna and a port or interface permitting configuring and monitoring; it is foreseen that a manufacturer would likely supply a hub 1 in a ready-to-use state such that an installer need not open its case or install any software. In one configuration, hub 1 is connectable to a personal computer 4, for example through a USB interface, computer 4 having installed thereon software functional to configure and monitor the hub 1. In another configuration, hub 1 has a network port whereby communications may be had with network 5. These communications may be through any conceivable type or protocol. In one example a hub 1 sends messages through a TCP/IP sockets-based protocol to a proprietary server existing on the network 5. In another example, hub 1 has software that permits it to be seen as an HTTP server from any device on network 5. Thus in some installations, hub 1 may be connected directly to and accessible from the Internet, allowing for access from any Internet-connected device. The antenna of hub 1 will typically be elevated and located in an obstruction-free locality to maximize signal-strength with end-devices 2.

End-devices 2 are preferably manufactured in an unconfigured state, ready for pairing with a hub 1, each device having a unique identity (UID) to discriminate it from others. Such end-devices 2 can be of varying types, providing many kinds of control and sensing functions. In one example, an end-device has an infra-red motion sensor built in, includes programming to record the time of the last motion event, and may also include programming to initiate a notification packet to a hub 1 upon a motion-sensing event. In another example, an end-device includes a keypad whereby a person can enter a code, upon which a message is sent to hub 1 containing a sequence of keypresses. Such an end-device may be paired with another device which activates and deactivates a door latch, by way of messaging from hub 1, and the hub contains programming and configuration to read the keypad end-device and control the latch end-device as correct codes are entered. In a further example, several end-devices 2 are located throughout a building, sensing the temperature at various locations. Another end-device 2 controls a central-air system, providing heating and cooling to the building at the direction of hub 1 without human intervention based upon thermostat data forwarded through hub 1. The kinds of end-devices 2 that can be employed are virtually limitless, so long as they are electronic and provide either a control or a sensing function while staying within the available data throughput limitations.

Intermediate-Range Packets and Transference Basics

Described herein are electronic devices that are functional at intermediate ranges even in populated or congested areas, providing for simple installation by an ordinary home- or business-owner, as will presently be described and shown. These devices can be made reliable enough to use in failure-intolerant situations, such as security systems, even where an RF spectrum is congested. Remote devices can be made to operate on battery power, use low-power transmitters, and in many cases made to operate through the sending of a single bit per packet. Equipment can be made to fit in a hand-held enclosure, e.g. with a small omnidirectional antenna operating in the UHF frequency band. It is sometimes the case that a low-data rate network device will be desired to be placed in a location where power is available, but where neither network cabling nor a WiFi network is available. This kind of application is particularly suitable for intermediate range equipment. One kind of intermediate-range technology is known as "LoRa", descriptions of which are publicly available from the LoRa Alliance of San Ramon, Calif., which maintains a website at www.lora-alliance.org.

Shown in FIG. 4 is the structure of a simple data packet which may be used in communication between a hub and an end-device, a sub-type of which is used in the LoRa protocol. The structure has three parts, which are a preamble 20, a data payload 22, and an optional address 21. Payload 22 is generic and can contain many kinds of data as desired, depending upon the functions provided by an end-device. Payload 22 will often contain a command or a response, for example a command to open a latch or a response that a power switch is presently in an "on" state. Address 21 discriminates between devices operating on the same communications channel, and may not be needed where a single hub and end-device pair are the sole devices operating on that channel. (A description of what defines a channel appears below.) Preamble 20 is present to provide synchronization for a radio-frequency receiver, at a hub or an end-device, at a programmed frequency such that the receiving device can decode the contents of the packet. A preamble is preferably a fixed, identifiable and unnatural pattern that can be recognized by a simple state machine without starting a general-purpose processor. The packet structure of FIG. 4 can be transmit using many modulation techniques; LoRa devices use frequency shift keying for interference immunity, although other modulations can be used in accordance with the dictates of a particular operating environment.

Packets can be transmit over a single carrier frequency, if desired, but because of benefits including resistance to noise and reduced impacts on particular parts of a frequency spectrum, spread-spectrum modulation has become popular. In this modulation technique, a sequence of frequencies is provided at a transmitter and a receiver; although in traditional encrypting systems the sequence might be generated by a pseudo-random generator with a secret seed and function parameters (which still can be used), for noise resistance and spreading of Tx power all that is needed is a sequence of frequencies uniformly spread over a given available set. This can be accomplished by the inclusion of a table as shown in FIG. 5, containing a sequence of n frequencies. In the example, each frequency $F_x$ is indexed by a sequence number $I_n$, such that the current operational frequency can be determined as a function of time from a point of synchronization, for example the end 23 of the preamble of a packet as in FIG. 4. The arrangement of frequencies in a sequence may be incremental, random, or in any order desired, keeping in mind that use of each frequency an equal number of times will result in the desired uniformity.

The transmission of a packet using this modulation technique is as shown in FIG. 6, beginning with the preamble at a known initial frequency $F_0$. The preamble is preferably not just a square wave, but a pattern whereby synchronization point 23 can be positively determined. The transmitter then sequences through the frequencies at a known period, mirrored by the receiver. For noise and interference immunity the sequence period is preferably much shorter than the time needed for each bit or symbol, but longer periods can be used to achieve a spreading of power across a spectrum. The sequence period should preferably be much shorter than the time of preamble transmission, such that preambles are easy to distinguish.

The power consumption of a transmitter is necessarily high during packet transmission, most of the power likely being consumed by the Tx output stage circuitry. A receiver, on the other hand, can implement a power-conserving procedure. Referring again to FIG. 6, the processor of a receiving device maintains itself in a state of sleep 25 while processing and receiving activities aren't underway; this can be particularly important for certain kinds of devices, especially for end-devices reliant upon battery-power, such as those with solar cells. A receiving device has built thereinto its receiving circuit an automated preamble recognizer; when recognition occurs a signal is sent to a processor to awaken and enter an active state of packet decoding 26. In the example of FIG. 6 an address is used, and the receiving processor performs functions needed to determine if the address in the packet is for its device. If an address is decoded and the packet is determined to be destined for another device, the processor can reset and go back to a sleeping state 25. For maximal power savings, therefore, an address is preferred to be toward the front of a packet, where it will be transited across a channel first before a data body. Where an address is matched, or where an address isn't used, a processor enters states of receiving and processing incoming data 27 and post-receipt processing 28 as needed. So in order to keep the processor of a particular device in a non-active state, it is important to positively discriminate the receipt of preambles of packets directed to the device from the preambles of other devices.

Multi-Channel Intermediate-Range Implementations

Existing intermediate-range networks use a common initial DSS frequency and/or channel for communications with devices in that network. This method has the advantage of making setup extremely simple. By this method, other networks may use other initial frequencies or channels, thereby discriminating between members of their respective networks. As such networks change to include interactive devices or grow to large numbers of member devices, the possibility of congestion, collisions and interference becomes a greater concern. At least one of a pair of wireless communications devices operational at intermediate ranges may be connected to the other paired device through a cloud based network.

Now turning to FIG. 8, a basic circuit is shown typical of many present intermediate-range network devices, which can support either single- or multiple-channel operation. The main parts of this circuit are a microcontroller 30 and an RF transceiver 32, which is connected to an antenna 34 located in a position to provide clear communications to other devices. A transceiver 32 may be essentially some analog radio-frequency circuits combined with a logic state machine that permits automatic operation for all or part of a packet transmission or reception. The use of transceiver 32 may leave the microcontroller 30 with additional processing capacity for such things as reading sensors, managing control circuits, etc., which may happen at the same time that packets are transiting a communications channel. Communication between the microcontroller and the transceiver is by way of data lines 39 and interrupt lines 40, by which microcontroller 30 manages the functions of transceiver 32 and transfers packet information received and to be sent. Transceiver has a packet buffer 45 sufficient to store all or part of a single packet, read- and write-accessible through data lines 39. Data lines 39 can be varied according to need or capabilities of a transceiver used, while interrupt lines 40 signal to the microcontroller events such as the start or completion of reception of an incoming packet. Were transceiver 32 to be a Semtech SX127x (introduced below), for example, data would be transferred by way of a single-bit wide serial bus using address locations to control registers and access a packet buffer, and data lines 39 would include single lines for in, out, clock and sync. In that example, a packet completion interrupt would be generated by a transition on the DIO0 line. When transceiver 32 is configured for operation on a channel orthogonal to those used by other end-devices, such interrupts would not occur when those end-devices communicate and microcontroller 30 would be left free to sleep or engage in other processing activity.

Microcontroller 30 also contains a packet buffer 44, which is typically larger than the transceiver buffer 45. As packets are to be transmitted, the microcontroller transfers them to the transceiver by way of data lines 39, typically one at a time. Packets received are correspondingly transferred from buffer 45 over the data lines and stored for processing in buffer 44. Apart from this packet data, setup commands are also sent by microcontroller 30 to program the transceiver for proper operation on a channel, once at initialization for single-channel operation and subsequently with or between packets where more than one channel is used. Where microcontroller 30 has been programmed for multi-channel operation, each packet within buffer 44 may carry with it a channel on which it is to be sent, or parameters thereof.

In an implementation using the Semtech SX127x and digital spread-spectrum, microcontroller 43 also contains a frequency table 43, as described above for FIG. 5. For that implementation, the transceiver 32 has storage only for two frequency settings, which are the one presently in use and the one to be used when it is time for a hop to a new frequency. The transceiver generates interrupts to the microcontroller indicating it is ready to receive the new frequency setting, which is subsequently sent over data lines 39 before the frequency hop is to occur. An alternate configuration would put frequency table 43 entirely on the transceiver 32, but for this example a simplified transceiver is used that does not.

Where a transceiver 32 and microcontroller 30 pair is incorporated into an end-device, at least one of a sensor 36 or a controller 38 will be included. Sensor 36 could be virtually any sensor, examples of which are a temperature probe, a keypad, a lighting sensor, an entryway closure detector, a motion detector, and a camera. Controller 38 could control a latch, a power switch, a thermostat, a motor speed controller, and many other things. Sensor 36 and controller 38 are connected to microcontroller 30 through data lines 41 and 42, which lines may be of any needed configuration, analog or digital. Where a transceiver 32 and microcontroller 30 pair is incorporated into a hub, sensor 36 and controller 38 may be omitted. Instead, a connection to a host processor or network 48 would be included, permitting configuration of and interactions with end-devices at intermediate-range.

While functioning as an end-device, one microcontroller 30 paired with one transceiver 32 are sufficient to operate in an ordinary way. Transceiver 32 is capable of being configured for a desired channel and transmitting or receiving packets to and from a hub, though not at the same time. End-devices do not typically have a need to do both concurrently, so this is usually not an issue. However there are advantages to incorporating multiple transceivers in a hub, as will be presently explained.

Figure 9:
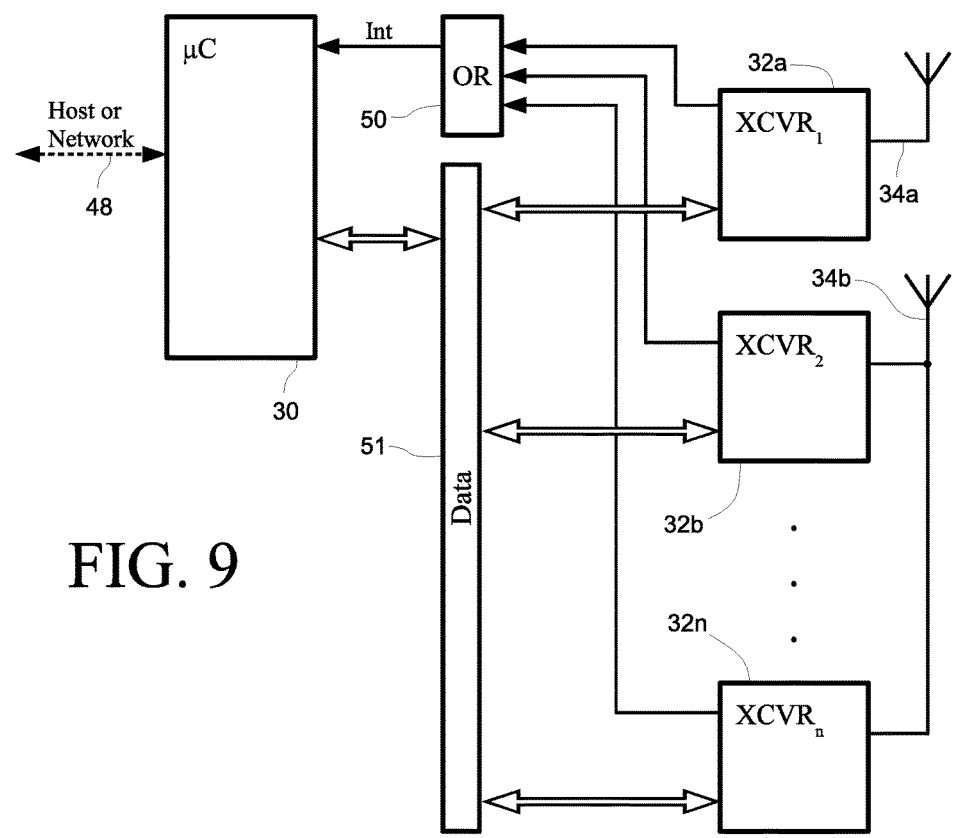
FIG. 9 shows an exemplary circuit architecture suitable for a hub having one transmitter and a number of receivers for simultaneous operation on differing channels.

FIG. 9 illustrates one configuration that may be used in a hub, providing multiple transceiver functionality. Here a microcontroller 30 is connected to n transceivers 34a through 34n by way of an interrupt gate 50 and data bus 51. Included within data bus 51 is sufficient multiplexing circuits to allow the microcontroller 30 to individually address each transceiver. In the example where the Semtech SX127x transceivers are used, this may be done by dropping the NSS pin of the individual transceiver to be attended to. Interrupt gate 50 combines the interrupt signals of each of the transceivers such that any interrupt in the group interrupts the microcontroller, and code therein can identify the particular transceiver flagging the interrupt and take appropriate action. In the drawing gate 50 is an OR logic gate, which suffices when all interrupt lines are low in a normal (non-interrupt) state; gate 50 could be AND logic gate if the reverse were true (lines normally high with low signal indicating an interrupt), or gate 50 could be a combination of logic circuits if needed. Now in practice it may be there are a sufficient number of interrupt inputs and general I/O pins on microcontroller 30 such that gate 50 and bus 51 aren't needed, particularly where the number of transceivers n is kept small, allowing for the microcontroller to communicate using parallel lines duplicating the setup and methods of FIG. 8.

The exemplary hub of FIG. 9 has the capability of transmitting and receiving wirelessly with end-devices at the same time, through antennas 34a and 34b. Antenna 34b is connected as an input to each of transceivers 32b through 32n, allowing each transceiver to receive on a different channel as programmed from the microcontroller 30. Depending upon the type of transceiver used, each transceiver may be isolated through filters and amplifiers (not shown) such that the proper impedance at the operational frequency range is preserved. Note that such a tying of transceivers to a common antenna makes them ineffective for concurrent operations in a transmitting mode; therefore microcontroller 30 would be configured to keep them in receiving-mode only. In contrast antenna 34a and transceiver 32a are configured to transmit and receive, having no sharing of antenna resources. Consideration should be given to shielding and to the distance between an antenna that may be used for transmitting and others that may be used for reception, such that potential interference is avoided.

The example shown in FIG. 9 has the capability of transmitting and receiving at the same time, with n−1 receivers monitoring one channel each. Transceiver 32a can be transmitting while all of 32b-n are ready to receive packets as they may transit n−1 channels. Microcontroller 30 may use the transceiver capable of free transmit operation 32a to perform interactive communication with an end-device without channel reprogramming, alternating between sending and receiving over the same channel. Alternatively, when using interactive communication with a particular end-device, microcontroller 30 may command transceiver 32a to switch to different channels as needed for transmissions to other end-devices, allowing one of transceivers 32b-n to receive the next packet from the particular end-device. If this is done, it is preferred that any transceivers configured to receive on the same channel be turned off, so as to avoid the discarding of packets produced at the hub. Assuming interactions with an end-device are symmetric in length, in theory the setup shown in FIG. 9 will support up to two concurrent interactive sessions with two end-devices while at the same time monitoring n−2 other lone-channel end-devices for alerting packets sent spontaneously, or more than that number of end-devices where such channels are shared (using the asynchronous mode described below, for example.)

In practice, the constraints on the number of transceivers that can be used will depend upon several factors. One of these is the speed of data bus 51 against the efficiency of commanding transceiver setup, and sending and receiving packet data. As most of the transceivers of the setup of FIG. 9 are used to receive, this limitation would be experienced in two main ways. First, it is possible to flood the system with incoming spontaneous packets such that they cannot be retrieved with sufficient speed across bus 51. The second way comes into play when single receivers 32 are each used to monitor multiple channels, for example when the number of monitored channels exceeds n−1. The reprogramming of a transceiver 32 across the bus 51 requires some time, and if that time exceeds the packet preamble length, packets will fail to be received. Where more than two channels are monitored by a single transceiver 32, the dwell time on a channel (to detect whether a packet transmission is in progress by an end-device) may further exacerbate this problem.

Another limitation of the setup of FIG. 9 relates to the use of a single transmitter. For example, interactive communication can be had with not more than two end-devices where that communication is symmetric. Thus if an event occurs that requires a simultaneous response to multiple end-devices, some of those responses may be delayed beyond a timeout period. This problem can be mitigated through the addition of more transceiver/antenna pairs, if those antennas can be placed at a sufficient distance from the receiving ones and if regulations allow. Note that although end-devices can be constructed with multiple transceivers, as in FIG. 9, it is expected that one transceiver will be sufficient for all but the most exceptional circumstances.

Wireless Channels, Orthogonality and Communications Principles

A wireless frequency spectrum can be segmented into definite channels that reduce interference and avoid unnecessary receiver power-up events on non-destination devices. Such channels are preferably "orthogonal" to each other as well, meaning that communication on one channel is very unlikely or practically impossible to interfere with communication on another. In one of the simplest channel designation schemes, each channel is assigned a unique and available center frequency per channel, for example as was done on the now-obsolete analog television spectrum. A one-to-one relationship is made between transmitters and frequencies in a radio locality, and all devices are to use only their assigned spectrum and nothing outside. For example, the 902-928 MHz ISM band could be divided into 52 500 kHz-wide channels, or 208 125 kHz-wide ones. Given that an intermediate network supporting ordinary consumers might have a range of many kilometers and thousands of end-devices, that is considered an insufficient number to avoid interference. Therefore further methods of discrimination are preferably used.

Introduced now are certain transceivers made for the LoRa protocol, commercially available from Semtech Corporation, which are identified as the SX127x product line. Note that there are transceivers available from other manufacturers that are equally suitable; these Semtech ones are used in this description merely out of convenience as a basis for discussion. The SX127x products are designed to be coupled to a microcontroller handling communication channel configuration and packet management, and have settings for a carrier frequency, signal bandwidth and the number of "chips" per symbol (6 settings), a chip being the smallest datum used in communication. Each combination of those represents substantially a unique channel orthogonal to others, potentially permitting collision-free communication where there is no more than one transmitting device per channel. Using such combinations, two channels may share a common carrier frequency or DSS carrier sequence, while still maintaining orthogonality. Other settings can be used to make additional channels having "partially-orthogonality" including an address, a bit rate, a CRC rate, an encoding type (Manchester/whitening/none), and others according to the manufacturer specifications; note however that the use of partially-orthogonal channels can result in processor-awakening events for packets destined for unintended end-devices, although they can be greatly reduced.

Upon identification of a useful set of channel combinations, a table can be constructed as shown in FIG. 7, each channel having a unique combination of settings useful for communication. In this example, each channel is assigned a spread-spectrum frequency sequence (FS), a spreading factor (SF), and a bit rate (BR) of communication. In a related example using the SemTech SX127x transceiver, each listed channel may be defined by a spread-spectrum frequency sequence, a spreading factor, a coding rate, and a bandwidth, from which an effective bit rate may be derived. The specific information stored in a table of channels may be varied depending upon the transceiver used, among other things. In one configuration, available frequency sequences are spread evenly over channel assignments, such that the preamble for each channel is sparsely or uniquely used—that is a device transmitting a packet on an assigned channel would use the first frequency in the sequence while transmitting the preamble, followed by the use of other frequencies in sequence. Other channel combinations can be varied in accordance with needs present, for example a frequency sequence could be replaced with an operating frequency where spread-spectrum communication was not used.

Upon determining a set of channel combinations, assignments can be made for individual devices. Again some devices are tolerant of long latencies, and no special treatment of these is required. Other devices serve better being on a channel that is free or substantially free of conflicts. The assignment of a channel to a hub and an end-device requires a setting at both, and this could be made by a manufacturer or its representative at the time of installation.

Frequency Sequence Processions and Spectrum Impact Smoothed Channel Sets

Where packets carrying a preamble such as that shown in FIG. 6 are used, the impact to the frequency $F_0$ in the usable spectrum is larger than the impact to other frequencies $F_a$ through $F_n$ generally. This effect is caused in large part by the long time used in transmitting the preamble, during which time the transmitter must remain on the same frequency $F_0$ for synchronization as compared to the other successive frequencies used. The longer the preamble with respect to the packet, the more exaggerated is this effect. For example where the SemTech 127x transceiver is used, the first frequency in a sequence will be used for the entire preamble of eight symbols or more, followed by the remainder of the packet during which the frequency dwell time may be as little as one symbol. This can yield a proportional dwell time that can be about tens of times greater for the frequency used to transmit a preamble. Additionally, the frequencies at the end of the sequence toward $F_n$ are used less frequently, due to the end of packet usually occurring in the middle of the frequency sequence, which may be exaggerated by short packets. As seen over time, if a frequency sequence is used continuously the impact on the spectrum of usable frequencies will be as depicted in FIG. 12, with accumulated emissions over time $E_T$ focused on the preamble frequency $F_0$ and an uneven impact ramping down through the frequency sequence.

This focused impact can be avoided through rotation of channels, each having a different frequency sequence and a unique $F_0$ used in a preamble relative to the other channels used in the rotation, hereinafter referred to as a spectrum-impact-smoothed (SIS) channel set. So looking back to FIG. 7, an SIS set maintaining the same bit rate and spreading factor could be fashioned from channels 0, 2, 4 and so forth, and another sequence could be ordered 1, 3, 5, etc., provided that the channels in each sequence included an $F_0$ unique to the others in that sequence. Within the set of sequences, where each frequency used occupies each sequential position no more than once through the channel set, the smoothing effect can be increased, although that is not necessary. Using the representation of FIG. 5, if there are n=72 frequencies usable in a DSS sequence, each would occupy the $I_0/F_a$ position exactly once through all sequences to make an SIS channel set of 72 channels. Preferably, each frequency would also occupy each $I_1/F_b$ through $I_{71}/F_n$ position exactly once as well to maximize the evening effect in the spectrum.

Frequency sequences can be generated and stored beforehand, or generated on the fly as needed. In a simple example, 72 adjacent ordered frequencies are available for use, and a set of SIS channels are generated by choosing a unique starting preamble frequency $F_0$ having the same position in the order as the channel number, each frequency in the sequence rising though the order and wrapping around as needed. In another example, an order is generated randomly, assigning one channel to each preamble frequency. In yet another example, a simple calculation or a pseudo-random number generator uses the channel number and the number in sequence to arrive at a frequency as needed. In the example shown in FIG. 5, the frequency used for the preamble is left unused for the remainder of a packet transmission, assisting in the equalization of frequency impacts where short packets are the norm. That is not required; a preamble frequency $F_0$ can be repeated, particularly where traversal through a sequence is also repeated where a packet is long.

As described above, the synchronization of frequency hopping through a series of frequencies can be done through detection of the end of a preamble. Two sides of a communication link will also need to be synchronized with respect to a channel, as traversal proceeds through an SIS set. That synchronization can be to any event shared between the sides, such as the traversal of a packet of a particular type or carrying a particular identity. In one example, a timeout period is used for synchronization: where a packet hasn't traversed the link for a specified period of time, both sides synchronize on the initial channel of an SIS set. This may also provide a fail-safe mechanism for dropped packets, allowing resynchronization in case of error.

In one implementation, two sides of a communications link utilizing an SIS set switches channel following every packet traversing the link, without further direction or instruction. The devices on both sides of the link follow a set of rules, including an order of traversal through the SIS channel set used. In one variation, the channels are used in an incremental order using a simple index variable, proceeding through channel 0, channel 1, channel 2 and so forth with each packet, wrapping around back to zero when all channels have been used. In another variation, the order of channels used follows a pattern stored in memory in a table or other structure. In yet another variation, a next channel is calculated using a pseudo-random formula using an incrementing index or the index of the channel currently being used, retaining other communication parameters such as bit rate, spreading factor, etc. In yet another variation, a microcontroller performs a calculation to evaluate the emissions impact on frequencies used since the beginning of traversal through the SIS channel set, and the next channel is selected to have a preamble frequency impacted less than the others since traversal began, thus maximizing the evening effect. A next SIS channel may generally be determined using a computation deterministic from information residing in the memory of both devices. In yet another variation, a next SIS channel is determined using a computation deterministic from information in a previously exchanged packet. The determination and of a next channel can have wide variation, as well as the timing of procession through a channel set, and what is important is that both devices in a communications link use cooperative rules and iterate through an SIS channel set in the same order.

Figures 10, 11:
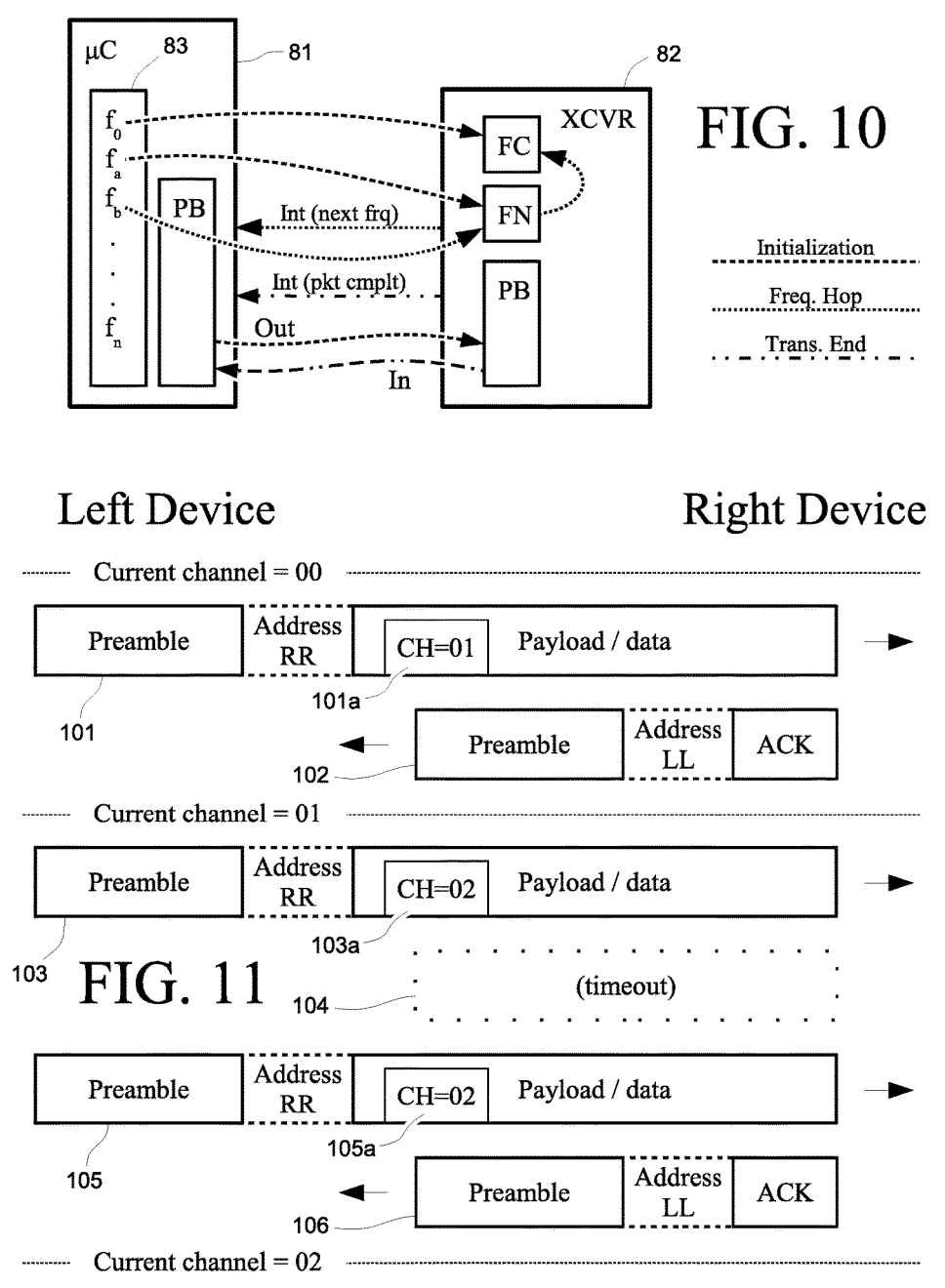

FIG. 10 illustrates in further detail the operation of a device on one side of a communications link using DSS communication, the device including a transceiver 82 of a type including the Semtech 127x transceiver in conjunction with a microcontroller 81. Transceiver 82 includes a register FC for the current frequency being used in transmission, a register FN for the next frequency to be used, and a packet buffer PB containing the contents of a packet being transmitted, as well as other programmable registers used in setup and operation. To initiate a packet exchange, the microcontroller 81 identifies a frequency sequence of a channel 83 (which may be that of an SIS channel), and transfers the first frequency value $f_0$ and the next frequency value $f_a$ to those registers on the transceiver as shown. If the exchange is a transmission to the device on the other side of the link, all or part of the contents of a packet will also be transferred to the packet buffer on the transceiver 82. When the registers on the transceiver 82 are loaded and communications setup has been completed, the transceiver is commanded to initiate communication.

For both transmission and reception, as DSS communication proceeds transceiver 82 frequency hops, moving the value of the next frequency FN to the current frequency FC. Before the time of the succeeding hop, microcontroller 81 is interrupted, and a succeeding frequency value is transferred to FN from the identified frequency sequence 83. Eventually the packet exchange will complete, and microcontroller 81 will be interrupted to do whatever post-processing is needed, including a reading of the transceiver's packet buffer PB if a packet was received.

As introduced above, synchronization of a traversal through a set of SIS channels may simply occur for each packet, channel switches occurring therebetween. Another method of synchronization is depicted in FIG. 11, wherein a "left" device synchronizes SIS channel switching with a "right" device over a wireless link through information contained in transmitted packets. Proceeding down the page, both devices are initially synchronized on channel 00, the right device in a listening mode prepared to receive a packet. The left device transmits a packet 101 on channel 0. Packet 101 includes a preamble, the address of the right device "RR", and a payload portion. Contained within that payload is a directive 101*a* to change to channel 01. Following the exchange of packet 101, the right device transmits an acknowledgment 102 to the left device on channel 00, which serves as confirmation that the right device will listen for future packets on the new channel as directed. Following the exchange of packet 102, both the left and the right devices are synchronized on channel 01.

The left device may send another packet 103 containing a directive 103*a* to change to channel 2. This packet is not received by the right device, so no acknowledgment is returned and a timeout 104 occurs. In such an event, the left device may resend 105 the packet containing the same directive 103*a*, until that directive is received and acknowledged 106 by the right device. Should an acknowledgment packet not be received by the left device, both devices may timeout and revert back to a default channel. As continuing to transmit the same packet would increase the impact on the preamble frequency of the current channel in use, it is preferable to limit the number of retries to a predetermined number.

It may be desirable to use the current SIS channel for transmissions from both devices while communicating, so as to equalize the spectrum impacts of transmissions from both devices at the same time, although that is not necessary. One device, such as the right device in the example of FIG. 11, may utilize a separate channel for acknowledgments or packets generally, or may even use an independent SIS channel selection for transmissions to another device on the other side of a link.

Depicted in FIG. 13 are the states of a state machine suitable for implementation in a microcontroller utilizing an SIS channel set, in a configuration shown in FIG. 10. After initialization or during normal operation, the microcontroller may determine that it is time 120 to send or receive a packet to or from the device at the other side of the communications link. If more than one transceiver is available to use, then one of them may be selected at this point. In this implementation, the next step is to determine a value next_channel, which is to be the succeeding SIS channel used. Where the device receives a channel directive by way of packets, this determination may be omitted.

The transceiver is then programmed 124 with a current frequency FC and a next frequency FN for DSS frequency hopping, to be done as in FIG. 6, coming from the current channel frequency sequence. This programming may be done through lookup in a table, or by computation, as desired. An index into the frequency sequence is set 126 to FSI=2, pointing to the third frequency in the sequence.

The machine then must take some extra actions if the device is sending a packet 128. These actions are to build a packet in a buffer 130, in accordance with whatever protocols are used by the present and remote devices. If the present device is determining the next channel for the remote device, part of this built packet may contain a directive to move to the next_channel determined earlier. The built packet is then copied to the transceiver 132, the state is set to transmitting 134, and a command is sent to the transceiver to transmit the packet in its buffer 138. If the device is merely receiving packets 128, then the state can be set to that 136 and the transceiver commanded to receive 140, having been properly configured with all necessary communications parameters.

Following the commanding of the transceiver, a sleeping state 142 may be entered. Now it is to be understood that this state could shutdown the microcontroller entirely until something further happens, or this state could indicate that the processor is free to manage other tasks. For example, a device implementing a sensing function that reports only when prompted may sleep for long periods of time, awakening only to manage long timeouts and other maintenance functions. In another example, a device managing multiple transceivers such as a hub may leave the state in sleep for the present transceiver, turning to manage other transceivers or functions as needed. Regardless, for discussion purposes the state machine may remain in a state of sleep until certain events happen.

While in sleep mode, interrupts 150 will be generated by the transceiver. When they are, there are several state paths that can be taken. If the next frequency register FN has been copied to the current frequency register FC, it will be dry 152 and need to be reloaded. If that has occurred, the next frequency in the sequence will be set 154, and the index incremented 156. If the index exceeds the number of channels in an SIS sequence, it may be set to 0 (the preamble frequency) or 1, avoiding re-use of the preamble frequency. If the packet has been fully exchanged 158, the main thread may be awakened 160 to exit the state of sleep. If the interrupt occurred for some other cause, such as the expiration of a timer or an alarm event, other processing 162 may occur in response. Interrupt processing will end 164, and the microcontroller may return to a state of sleep or may proceed in an awakened state.

When awakened, the current channel will be rotated 144 with the next channel determined earlier, and any post-processing needed may be done 146. That post-processing may include retrieving and decoding a packet if one was received by the transceiver, and may further include the setting of a current_channel, when directed from the device on the other side of a link.

To avoid timeouts that cause a reversion back to a default channel, periodic packets may be sent at an interval less than the timeout period, which packets may be simple "ping" packets.

The teachings regarding SIS channel sets can be applied to two devices in a simple point-to-point fashion, or to multiple devices in varying interactions such as hubs and end-devices. Where a hub is used, a frequency sequence index may be kept for multiple devices, such that spectrum impacts can be smoothed with respect to individual of those devices.

Selective Short Timeouts and Recovery of SIS Channel Synchronization

Figure 14:
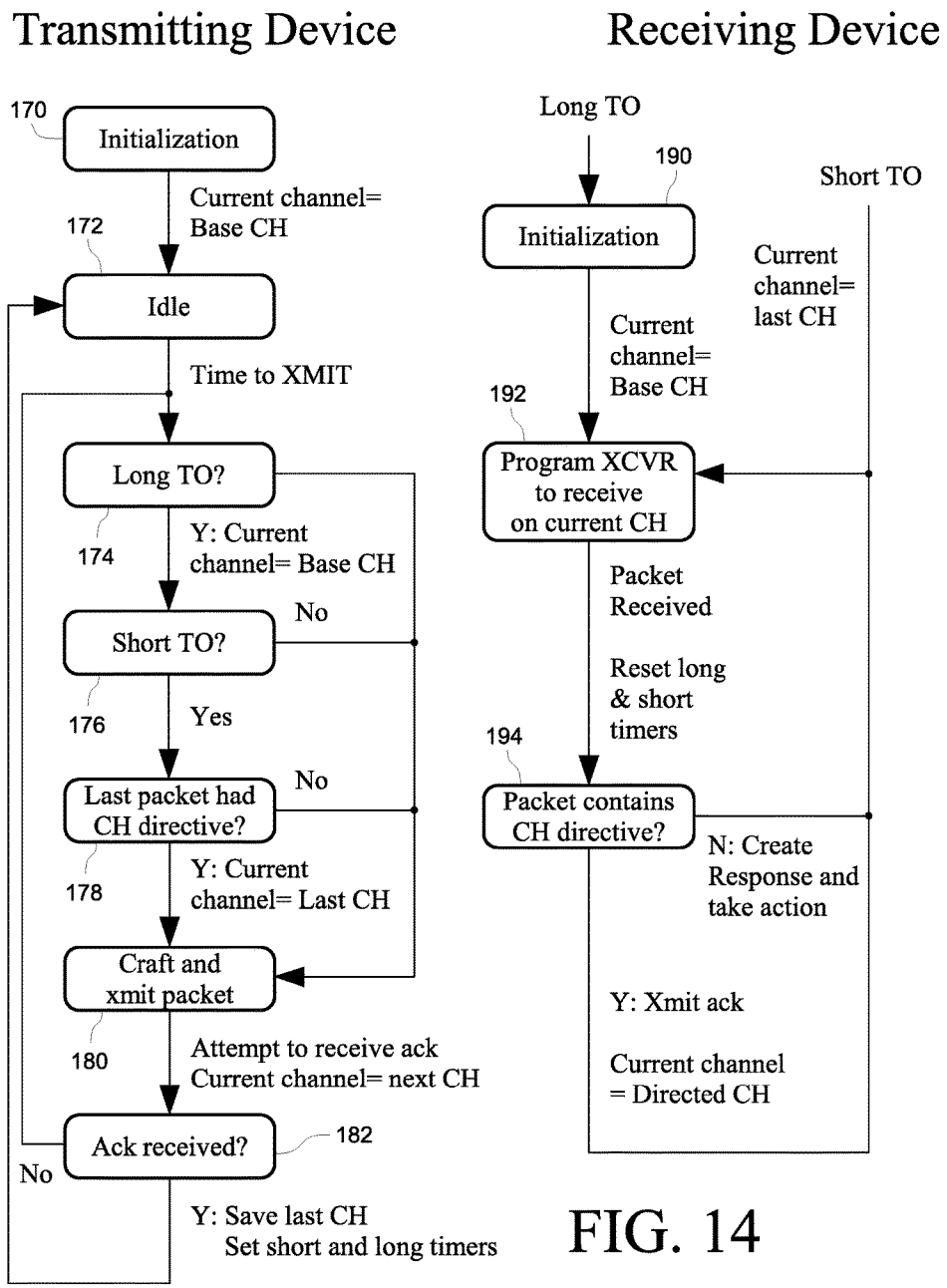
FIG. 14 shows traversal of a stream-transmitter and a stream-receiver through an exemplary set of states implementing SIS channel directives and a short- and a long-timeout period.

It will be the case some of the time that more than one packet will be transmitted by a single device within a longer timeframe, such as 10 or 30 seconds. For the purposes of this disclosure, this will be referred to as "streaming", even though a stream or succession of packets may contain unrelated data not in a stream of underlying information. This kind of streaming can occur, in several examples, where one device reports the value of sensor frequently, where one device is permitted to send commands or requests on demand, or where a device transmits a continuous stream of audio data. In this kind of a data stream, the use of SIS channels may provide desirable smoothing to impacts in an RF spectrum.

Where one device exchanges packets with another using an SIS channel sequence, the possibility exists that a packet exchange will be unsuccessful. Where a packet is not received as intended, a condition can result where the transmitter of a stream of packets is using a different SIS channel than that of the receiver. Were the protocol described for FIG. 11 used, for example, this could result from a dropped packet and a corresponding missed channel-changing directive. This condition is recoverable by the use of a timeout operation, that is where one device fails to receive a packet from the other for a specified period of time, after which both devices may revert to a default channel, restoring synchronization.

Where one device is streaming packets to the other, an opportunity exists to avoid SIS channel desynchronization for up to this potentially long timeout period. In the exemplary set of states shown in FIG. 14, a transmitting device is configured to transmit successions of packets to a receiving device using an SIS channel set. Both devices use a protocol such as that shown in FIG. 11 that may include a directive to use a different SIS channel for the next packet exchange. Now, not every packet need contain a packet directive, nor is it necessary to include a directive to a different channel that the one presently in use. Infrequent channel changes make the link less susceptible to channel desynchronization due to dropped packets, but at the cost of smoothness of impacts over the RF spectrum during the period a single channel is used.

With that in mind, the stream-transmitting device initializes 170 into a state where the current channel is set to a default base SIS channel, establishing a base from which synchronization can occur in an SIS channel sequence. A transmitting device will ordinarily have a number of tasks to perform before or between the sending of packets, which may occur in state 172 where the transmitter is idle. If the transmitting device has no tasks to perform, it may enter a sleep or power-saving mode while in idle 172.

At some point in time, the transmitting device will determine that it is time to send a packet. In a first state 174, an evaluation is made to determine whether the length of time from the previous packet to the current one will exceed a longer timeout. Again, this timeout is provided to ensure that both devices return to a point of channel synchronization in the event of an unmanaged error. If a long-period timeout has occurred, the receiving device can be expected to have returned to the default base channel, and correspondingly the current channel will be set to that for both devices.

If a long-period timeout has not occurred, then a determination is made against the short timeout period 176. If the short timeout period has been exceeded, the receiving device will either have stayed on or reverted to the SIS channel used in the last packet. An appropriate determination is then made 178 as to whether the last packet contained a directive that changed the current SIS channel. If that determination is positive, the transmitting device reverts back to the previously used SIS channel, as the previously-transmitted channel directive will not be in effect at the receiving device.

Following that, the transmitting device enters a state 180 of assembling and transmitting a packet, substantially as shown and described for FIG. 13. The assembled packet may contain an SIS channel directive to move to a new channel, to stay on the current channel, or may contain no channel directive at all. The frequency and timing of SIS channel directives is a matter of design choice. In one example, a channel directive is sent with each packet, maximizing the smoothing effect at the cost of potentially dropped packets and directives and channel desynchronization for the short timeout period. In another example, a channel directive is sent after n packets on the same channel, n being chosen to maximize data throughput in the face of potential desynchronization events and less smoothing over short periods of time. In a further example, a channel directive is sent at regular intervals of time, those intervals typically being much less than the long timeout period. Wide variations in the sending of channel directives are permissible, adapted to the needs of wireless devices and extremes in RF environments of use. The time after a packet with a channel directive is sent to the receiving device is a good time to set the current channel variable to the new channel.

Following the transmission of the packet, potentially containing an SIS channel directive, the transmitting device waits for a period of time for an acknowledgment in return, which period may be the short timeout period. Acknowledgments may use the same channel as the transmitted packet, the new channel as directed, or another channel entirely separate and different if that is desired. While in that state, a determination is made 182 whether a valid acknowledgment was received in time for the latest packet sent. If yes, the short and the long timers may be reset, and the transmitting device may return to idle 172. If no acknowledgment is received 182, the transmitting device may proceed to retransmit the last packet or a new packet containing appropriate information. That may be done by a return to state 174, so that a succession of unacknowledged packets occupying the space of the long timeout period may result in a reset to the default channel. In an alternative configuration, where a packet or a certain number of a succession of packets with a channel-change directive have gone unacknowledged, it may be desired to stop retransmitting those packets until the long timeout event happens, so as to avoid an imbalanced emission impact to the spectrum on the current channel. In an additional alternative configuration, where a packet follows a previous one that was not acknowledged, that packet includes or has an increased likelihood of including a channel-change directive, which may avoid interference appearing in the local RF environment and an imbalanced emission impact on the current preamble frequency.

In this implementation, the channel-changing operation of the receiver is relatively simple. On initialization or a long timeout 190, the current channel is set to an initial base channel, permitting a fall-back resynchronization with the transmitting device of the SIS channel in the event of a major communication failure or desynchronization event.

Once entering state 192, the receiving device programs the transceiver for communication on the current channel, whatever it may be at the time, and waits for a packet to be received. Where a packet is received, both the short and long timers are reset, and the receiving device proceeds 194 to examine the packet for a channel-changing directive. If one is found, the device proceeds to transmit an acknowledgment, which may be immediate but preferably well within the short timeout period. That acknowledgment may be presented as a stand-alone packet, or may be included in a packet with other information being sent to the transmitting device.

In one example, a receiving device transmits acknowledgments on the channel being used by the transmitter to send the packet containing a channel-changing directive. In another example, for acknowledgments a receiving device uses the channel identified by a channel directive. In yet another example, a receiving device for acknowledgments uses a channel determinable through a calculation from state and information kept at both the transmitter and the receiver, such as an acknowledgment channel looked up in a table using a directed channel as an index or equation input. In yet another example, a specified channel is used for acknowledgment, which may be separate from a previous or a newly directed channel. At least one of a pair of wireless communications devices operational at intermediate ranges may be connected to the other paired device through a cloud based network.

Where the receiving device receives a packet with no channel-changing directive, an appropriate response is determined or created, which may be the transmission of an acknowledgment back to the transmitting device, the transmission of a packet containing other information, the changing of variables or other state in the receiving device, the sampling or programming of sensing or controlled elements of the receiving device, other actions, or no action at all. In one alternative implementation, for packets that do not contain a channel-changing directive, the transmitting device does not wait for an acknowledgment. Where such behavior is used, packets received by the receiving device without a channel-changing directive need not be acknowledged.

Following the reception of a packet 194, the receiving device proceeds to do any necessary programming of the transceiver 192 and waits for a further packet from the transmitting device. Where no packet is received by the receiving device within the short timeout period after the reception of a packet, the current channel is set to the previously used channel, the transceiver set to receive on that channel, and SIS channel synchronization is potentially restored with the transmitting device before the expiration of the long timeout period. As with the transmitting device, the states shown are those with respect to the exchange of a stream of packets; other state may be kept at the receiving device, and other activity may occur or processing be done to effect other functions not shown.

Timeout calculations can be relative to the beginning or ending of a packet transmission, and can also include time adjustments for packet processing or other related activities at either or both of the transmitter or receiver. The timeout periods may differ in minor part between the transmitting and receiving devices, compensating for processing delays and other practical concerns. The better the timeout periods are coordinated at the transmitting and receiving devices, the better the devices will recover from missed packets and other channel desynchronizing events. In one method, two countdown timers are set to the long and short timeout periods at the end of packet transmission, and determinations are simply a comparison to the particular timer against zero. Another method uses a run-time clock on a microcontroller, and timeout determinations are made using elapsed-time calculations. Where a microcontroller is used, it may be desired to implement timeout functions using timers that generate interrupts on expiration, avoiding the disadvantages of constant looping, potentially improving responsiveness and power consumption. In another alternative, a small hesitation period is implemented close to the expiration of timer limits, ensuring that a condition does not arise where the transmitter sends a packet assessing a timeout on one side of a limit while the receiver assesses the same timeout on the other side. That may be implemented by checking for a timer to be close to expiration (a small percentage of the applicable timeout period) and waiting for the timer to expire before sending a packet in-stream or changing the channel at the transceiver.

The setting of short and long timeout periods may depend upon the particular implementation and use of the devices involved. A long timeout period should generally be set sufficiently long so as to enable other channel-synchronizing methods to operate, while at the same time not being so long that a catastrophic or unusual desynchronizing event impairs the recovery of the communications link unnecessarily. In one example involving high redundancy, a packet exchange may require more than one second, and the long timeout is set for 20 or 30 seconds. In another example needing less redundancy, a typical packet requires much less than one second and a long timeout period might be 10 seconds.

A short timeout period is set to some portion of the selected long timeout period, but larger than the time needed to exchange most or all single packets in the protocol used. The short timeout period may be adaptive, allowing for a device in a link to coordinate a present short timeout period with the other. In one example, a transmitting device anticipates the maximal timing between packets, and directs a short timeout period with the other device. Thus a transmitting device sending regular packets every n milliseconds would set a short timeout period substantially larger than n, so as to avoid short timer expiration events. In another example, a transmitting device sends a confirmatory packet following an acknowledged packet containing a channel directive, thus confirming that the devices at both ends of a link will fall back on a set SIS channel in the event of a short timeout. Such directives may be contained within transmitted packets, which may be the same ones that contain an SIS channel directive or otherwise.

Figure 15:
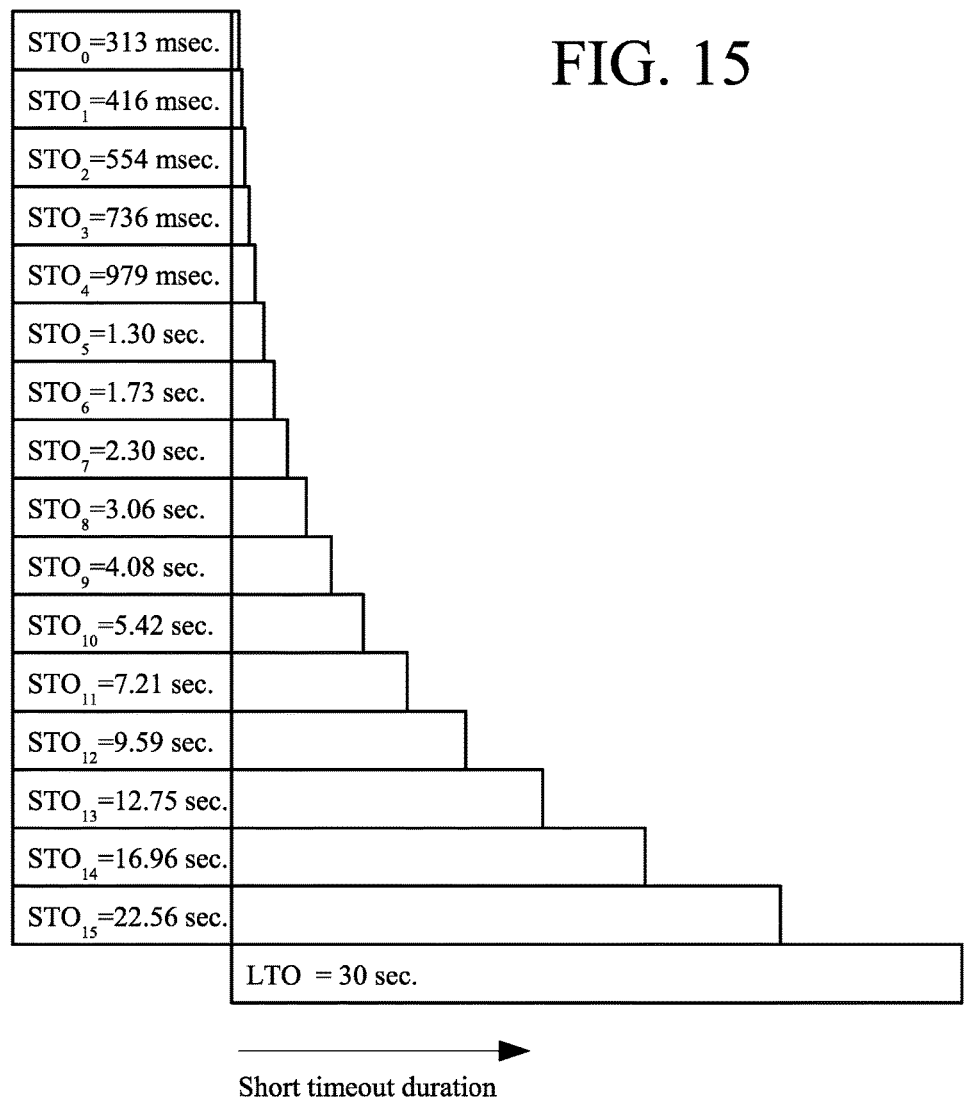
FIG. 15 shows an exemplary set of selectable short timeout periods.

Now turning to FIG. 15, an exemplary set of sixteen selectable short timeout periods is presented, usable in connection with a long timeout period of 30 seconds. These short periods follow an exponential scale, which in this example is derived from the equation $LTO*(1.33^{(1.0-(i+1))})/1.33$, where LTO is the period of the long timeout and i is the short period's position in the sequence. These values could be calculated at run-time, but may be better pre-calculated and stored in program-accessible memory in a microcontroller. Providing a selection of 16 of these makes possible a directive of only a conservative 4 bits in a packet, although more or less selections could be provided depending upon the circumstances of use.

A transmitting device, in making a selection of a short timeout period, may consider the kind of data being transmitted. For example, it may be that the transmitting device is sending no data other than infrequent pings to the receiving device, maintaining or measuring the quality of the communications link. There, the selection of a larger short period would be appropriate. So if pings were being sent every 15 seconds and the set depicted in FIG. 15 were used, $STO_{14}$ having a period of 16.96 seconds would be an appropriate selection. Where a device was streaming a large quantity of data, such as an image or a debugging log, a selection with a smaller short timeout period would be better, avoiding a long recovery delay of seconds should a packet be dropped and a channel desynchronization event occur. Where large packets were being streamed frequently and with a low redundancy, those packets might come every half-second, for example. In that event, selection of $STO_3$ of 736 milliseconds would permit channel synchronization recovery in about one second. The parameters of the selection of a short timeout period may also be adapted on-the-fly: where a transmitting device receives an acknowledgment after a channel-change directive and a short timeout occurs, this indicates a larger short timeout period may be used while maintaining the smoothing impact on the RF spectrum. A transmitting device may set a smaller short timeout period when beginning a large or frequent data exchange, followed by the setting of a larger short timeout period after that data has been exchanged. At least one of a pair of wireless communications devices operational at intermediate ranges may be connected to the other paired device through a cloud based network.

The precise method used to select a short timeout period may be designed in practice any may vary for different device types, kinds of data being exchanged, RF noise and other environmental conditions, and other factors. As guidance, a short timeout period may generally be set to the next larger available short-period value larger than M+A, where M is the maximum expected time between packets and A is a buffer to allow for errors in that expectation.

In another example, two devices may stream data to each other, each maintaining a current SIS channel for data streaming from the particular device. Acknowledgments of channel directives from the other device may be included in the data being streamed to that device.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. Some of the descriptions herein refer to specific protocols and modulation types, which are only exemplary; other protocols and types may be substituted as desired in accordance with the inventive concepts. More specifically, it is to be understood that although the accompanying description makes reference to the LoRa and LoRaWAN protocols and designs, the inventions described herein may be used in other kinds of intermediate-range networks, RF bands and using other equipment. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way. At least one of a pair of wireless communications devices operational at intermediate ranges may be connected to the other paired device through a cloud based network.

What is claimed:

1. A pair of wireless communications devices operational at intermediate ranges, said devices utilizing a set of discrete radio frequencies upon which are organized a set of spectrum-impact-smoothed (SIS) channels each having a distinct digital spread spectrum frequency sequence, each SIS channel specifying a unique frequency to be used in the transmission of a packet preamble relative to all of the other SIS channels within the set, a first one of said devices being a source of streamed data and the second one being a receiver of streamed data, each of said devices comprising:

a transceiver functional for wireless communication using the frequency sequence of the spectrum-impact-smoothed channels;

and an electronic circuit implementing a state machine immutable to power-transient events;

wherein said state machine of each device is configured to sequence through a set of states to implement the functions of:

(a) configuring said transceiver of the particular device to transmit or receive a packet on a channel having distinct communication parameters, (b) synchronizing with the other of said wireless devices on a first communications channel in the set of SIS channels, said synchronizing initiating a sequence of SIS channels beginning with the first communications channel, (c) exchanging a packet with the other of said wireless devices using the first communications channel, (d) repeatedly determining a next SIS channel to be used in the course of exchanging a packet with the other of said devices, said determining selecting a channel as directed or otherwise not yet used in the course of the sequence of SIS channels beginning with a first communications channel, (e) repeatedly exchanging a packet with the other of said wireless devices using a determined next SIS channel;

wherein said state machine of said first device is configured to sequence through a set of states to implement the functions of:

(f) transmitting a packet to said second device containing an SIS channel directive from a current to a successive channel, (g) after the transmission of a packet containing an SIS channel directive to a successive channel, receiving an acknowledgment from said second device, and (h) after the receipt of an acknowledgment following the transmission of a packet containing an SIS channel directive to a successive channel, setting a current channel to the successive channel acknowledged by the second device; and wherein said state machine of said second device is configured to sequence through a set of states to implement the functions of:

(i) receiving a packet from said first device containing an SIS channel directive to a successive channel, and (j) after the reception of a packet containing an SIS channel directive to a successive channel, transmitting an acknowledgment to said first device, and (k) after the reception of a packet containing an SIS channel directive to a successive channel, setting a current channel to the successive channel acknowledged by the first device.

2. The pair of devices as recited in claim 1, wherein said state machine of said first device is configured to sequence through a set of states to implement the function of:
   (l) on expiration of a short timeout period beginning with the transmission of a packet containing an SIS directive, reverting a current SIS channel to a previously used channel.

3. The pair of devices as recited in claim 2, wherein said state machine of said first device is configured to sequence through a set of states to implement the functions of:
   (m) transmitting a packet to said second device containing a directive to change a short timeout period, and
   (n) following the transmission of a packet containing a directive to change a short timeout period, using the directed short timeout period for reversion to a previously used channel.

4. The pair of devices as recited in claim 2, wherein said state machine of said second device is configured to sequence through a set of states to implement the functions of:
   (m) receiving and interpreting a packet to said second device containing a directive to change a short timeout period, and
   (n) following the reception of a packet containing a directive to change a short timeout period, using the directed short timeout period for reversion to a previously used channel.

5. The pair of devices as recited in claim 1, wherein said state machine of said second device is configured to sequence through a set of states to implement the function of:
   (l) on expiration of a short timeout period beginning with the reception of a packet containing an SIS directive, reverting a current SIS channel to a previously used channel.

6. The pair of devices as recited in claim 1, wherein both of said devices function as a stream-transmitter and a stream-receiver in a bi-directional streaming link, and further wherein each device directs a current SIS channel for the stream originating from that device.

7. A wireless communications device operational at intermediate ranges, said device utilizing a set of discrete radio frequencies upon which are organized a set of spectrum-impact-smoothed (SIS) channels each having a distinct digital spread spectrum frequency sequence, each SIS channel specifying a unique frequency to be used in the transmission of a packet preamble relative to all of the other frequency sequences of the SIS channels within the set, said device comprising:
   a transceiver functional for wireless communication using the frequency sequence of the spectrum-impact-smoothed channels with another wireless device; and
   an electronic circuit implementing a state machine immutable to power-transient events;
   wherein said state machine of said device is configured to sequence through a set of states to implement the functions of:
   (a) configuring said transceiver to transmit or receive a packet on a channel having distinct communication parameters,
   (b) synchronizing with a stream-receiving device on a first communications channel in the set of SIS channels, said synchronizing initiating a sequence of SIS channels beginning with the first communications channel,
   (c) exchanging a packet with the stream-receiving device synchronized on a first communications channel in a sequence of SIS channels,
   (d) repeatedly determining a next SIS channel to be used in the course of exchanging a packet with another synchronized device, said determining selecting a channel not yet used in the course of the sequence of SIS channels beginning with a first communications channel,
   (e) repeatedly exchanging a packet with the stream-receiving device using a determined next SIS channel,
   (f) transmitting a packet to the stream-receiving device containing an SIS channel directive from a current to a successive channel,
   (g) after the transmission of a packet containing an SIS channel directive to a successive channel, receiving an acknowledgment from the stream-receiving device, and
   (h) after the receipt of an acknowledgment following the transmission of a packet containing an SIS channel directive to a successive channel, setting a current channel to the successive channel.

8. The device recited in claim 7, wherein said state machine is configured to sequence through a set of states to implement the function of:
   (i) on expiration of a short timeout period beginning with the transmission of a packet containing an SIS directive, reverting a current SIS channel to a previously used channel.

9. The device recited in claim 8, wherein said state machine is configured to sequence through a set of states to implement the functions of:
   (j) transmitting a packet to the stream-receiving device containing a directive to change a short timeout period, and
   (k) following the transmission of a packet containing a directive to change a short timeout period, using the directed short timeout period for reversion to a previously used channel.

10. The device recited in claim 9, wherein said state machine is configured to sequence through a set of states to implement the function of:
    (l) prior to transmission of a directive to change a short timeout period, determining a short timeout period by a lookup in a table containing a fixed set of exponentially-scaled period values.

11. The device recited in claim 9, wherein said state machine is configured to sequence through a set of states to implement the function of:
    (l) prior to transmission of a directive to change a short timeout period, determining a short timeout period based upon an expectation of the time of transmission of a subsequent packet.

12. The device recited in claim 7, wherein said state machine is configured to sequence through a set of states to implement the function of:
    (i) after the receipt of the acknowledgment following the transmission of a packet containing an SIS channel directive to a successive channel, transmitting a packet confirming receipt of the acknowledgment.

13. The device recited in claim 7, wherein said state machine is configured to sequence through a set of states to implement the function of:

(i) setting the current channel to an initial base channel after the expiration of a long period timeout.

14. The device recited in claim 13, wherein said state machine is configured to sequence through a set of states to implement the function of:
(j) following a certain number of successive unacknowledged packets with a channel-change directive, halting the transmission of packets to the stream-receiving device until the expiration of the long period timer.

15. A wireless communications device operational at intermediate ranges, said device utilizing a set of discrete radio frequencies upon which are organized a set of spectrum-impact-smoothed (SIS) channels each having a distinct digital spread spectrum frequency sequence, each SIS channel specifying a unique frequency to be used in the transmission of a packet preamble relative to all of the other frequency sequences of the SIS channels within the set, said device comprising:
a transceiver functional for wireless communication using the frequency sequence of the spectrum-impact-smoothed channels with another wireless device; and
an electronic circuit implementing a state machine immutable to power-transient events;
wherein said state machine of said device is configured to sequence through a set of states to implement the functions of:
(a) configuring said transceiver to transmit or receive a packet on a channel having distinct communication parameters,
(b) synchronizing with a stream-transmitting device on a first communications channel in the set of SIS channels, said synchronizing initiating a sequence of SIS channels beginning with the first communications channel,
(c) exchanging a packet with the stream-transmitting device using the first communications channel,
(d) repeatedly determining a next SIS channel to be used in the course of exchanging a packet with the other of said devices, said determining selecting a channel as directed,
(e) repeatedly exchanging a packet with the stream-transmitting device using a determined next SIS channel;
(f) receiving a packet from the stream-transmitting device containing an SIS channel directive to a successive channel, and
(g) after the reception of a packet containing an SIS channel directive to a successive channel, transmitting an acknowledgment to the stream-transmitting device, and
(h) after the reception of a packet containing an SIS channel directive to a successive channel, setting a current channel to the successive channel.

16. The device recited in claim 15, wherein said state machine is configured to sequence through a set of states to implement the function of:
(i) on expiration of a short timeout period beginning with the reception of a packet containing an SIS directive, reverting a current SIS channel to a previously used channel.

17. The device recited in claim 16, wherein said state machine is configured to sequence through a set of states to implement the functions of:
(j) receiving and interpreting a packet to the stream-transmitting device containing a directive to change a short timeout period, and
(k) following the reception of a packet containing a directive to change a short timeout period, using the directed short timeout period for reversion to a previously used channel.

18. The device recited in claim 15, wherein said device is configured to transmit an acknowledgment to the stream-transmitting device on one of (1) the channel used to receive a packet from the stream-transmitting device containing an SIS channel directive to a successive channel or (2) the successive channel contained in an SIS channel directive.

19. The device recited in claim 15, wherein said device is configured to transmit an acknowledgment to the stream-transmitting device on a channel other than that used to receive a packet from the stream-transmitting device containing an SIS channel directive to a successive channel and the successive channel contained in that SIS channel directive.

20. The pair of wireless communications devices operational at intermediate ranges of claim 1, wherein at least one of the devices is connected to the other device through a cloud based network.

* * * * *